United States Patent [19]

Kantabutra

[11] Patent Number: 5,508,952
[45] Date of Patent: Apr. 16, 1996

[54] CARRY-LOOKAHEAD/CARRY-SELECT BINARY ADDER

[76] Inventor: Vitit Kantabutra, 5 Carter Dr., Hilton, N.Y. 14468

[21] Appl. No.: 138,777

[22] Filed: Oct. 19, 1993

[51] Int. Cl.⁶ .................................................. G06F 7/50
[52] U.S. Cl. ................................................. 364/787
[58] Field of Search .................................. 364/787–788, 364/786

[56] References Cited

U.S. PATENT DOCUMENTS

| | | |
|---|---|---|
| 3,700,875 | 10/1972 | Saenger et al. |
| 3,805,045 | 4/1974 | Larsen. |
| 4,525,797 | 6/1985 | Holden. |
| 4,737,926 | 4/1988 | Vo et al. |
| 4,761,760 | 8/1988 | Tomoji. |
| 4,764,888 | 8/1988 | Holden et al. |
| 4,901,269 | 2/1990 | Stoelzle. |
| 4,905,180 | 2/1990 | Kumar. |
| 5,027,312 | 6/1991 | Knauer et al. |
| 5,047,976 | 9/1991 | Goto et al. |
| 5,117,386 | 5/1992 | Persoon et al. .................. 364/787 |
| 5,122,982 | 6/1992 | Cohn. |
| 5,136,539 | 8/1992 | Kumar. |
| 5,327,369 | 7/1994 | Ashkenazi ........................ 364/787 |

OTHER PUBLICATIONS

Waser, "High–Speed Monolithic Multipliers for Real–Time Digital Signal Processing", 1978 IEEE, pp. 19–29.
Joseph J. F. Cavanagh, *Digital Computer Arithemtic Design and Implementation*, McGraw–Hill, Inc., 1984, pp. 98–124.
Alain Guyot, et al., *A Way to Build Efficient Carry–Skip Adders*, IEEE Transactions on Computers, vol. C–36, No. 10, Oct. 1987, pp. 1144–1152.
Inseok S. Hwang and Aaron L. Fisher, *Ultrafast Compact 32–bit CMOS Adders in Multiple–Output Domino Logic*, IEEE Journal of Solid–State Circuits, vol. 24, No. 2, Apr. 1989, pp. 358–369.
Pak K. Chan and Martine D. F. Schlag, *Analysis and Design of CMOS Manchester Adders with Variable Carry–Skip*, IEEE Transactions on Computers, vol. 39, No. 8, Aug. 1990, pp. 983–992.
Tom Lynch and Earl Swartzlander, *The Redundant Cell Adder*, IEEE, 1991, pp. 165–170.
H. R. Srinivas and Keshab K. Parhi, *A Fast VLSI Adder Architecture*, IEEE Journal of Solid–State Circuits, vol. 27, No. 5, May 1992, pp. 761–767.
Thomas Lynch and Earl E. Swartzlander, Jr., *A Spanning Tree Carry Lookahead Adder*, IEEE Transactions on Computers, vol. 41, No. 8, Aug. 1992, pp. 931–939.
Pak K. Chan, et al., *Delay Optimization of Carry–Skip Adders and Block Carry–Lookahead Adders Using Multidimensional Dynamic Programming*, IEEE Transactions on Computers, vol. 41, No. 8, Aug. 1992, pp. 920–930.

*Primary Examiner*—Tan V. Mai
*Attorney, Agent, or Firm*—Bell, Seltzer, Park & Gibson

[57] ABSTRACT

A carry-lookahead/carry-select binary adder includes a plurality of Manchester carry-lookahead cells arranged by length in monotonically increasing order at a first level and a carry-lookahead cell(s) at a second level connected to the first level cells. The cells generate corresponding groups of carry-propagate and carry-generate bits for respective portions of a first and a second binary operand to be summed. From each of the groups, a carry signal is derived for selecting the outputs of one of two parallel binary ripple adders. Based on the selection, the correct sum bits for respective portions of the first and a second binary operands are output. By arranging the first level cells in monotonically increasing order, the summation can occur quickly and each of the portions can be summed in a relatively uniform amount of time. In particular, the critical path delays associated with the summation of each of the portions are kept relatively uniform, based on a sum of the square of the length delay approximation. In the preferred embodiment, each of the binary ripple adders are replaced by a smaller-scale version of the hybrid adder itself. The hybrid adder can also be configured to add two 56-bit operands, which is ample for performing summation of the 52-bit mantissas of IEEE Standard-754 double-precision floating-point numbers. At this level of integration, a plurality of groups of Manchester carry-lookahead cells are implemented at the first level, and each group is arranged in monotonically increasing order.

29 Claims, 10 Drawing Sheets

FROM FIG. 5A.

CARRY-LOOKAHEAD/CARRY-SELECT BINARY ADDER

FILED OF THE INVENTION

The present invention relates to integrated circuits, and more particularly to integrated circuits for performing arithmetic operations.

BACKGROUND OF THE INVENTION

Binary summation (i.e., "addition") is one of the most important arithmetic operations performed by general-purpose and application specific processor systems (e.g., digital signal processors). This is because arithmetic summing operations are essential not only for addition, but also for subtraction, multiplication and division since these operations typically include repetitive summation steps. Accordingly, the speed of microprocessors and other general-purpose arithmetic processors are heavily dependent on the speed of the adder circuits contained therein.

Figure 1:
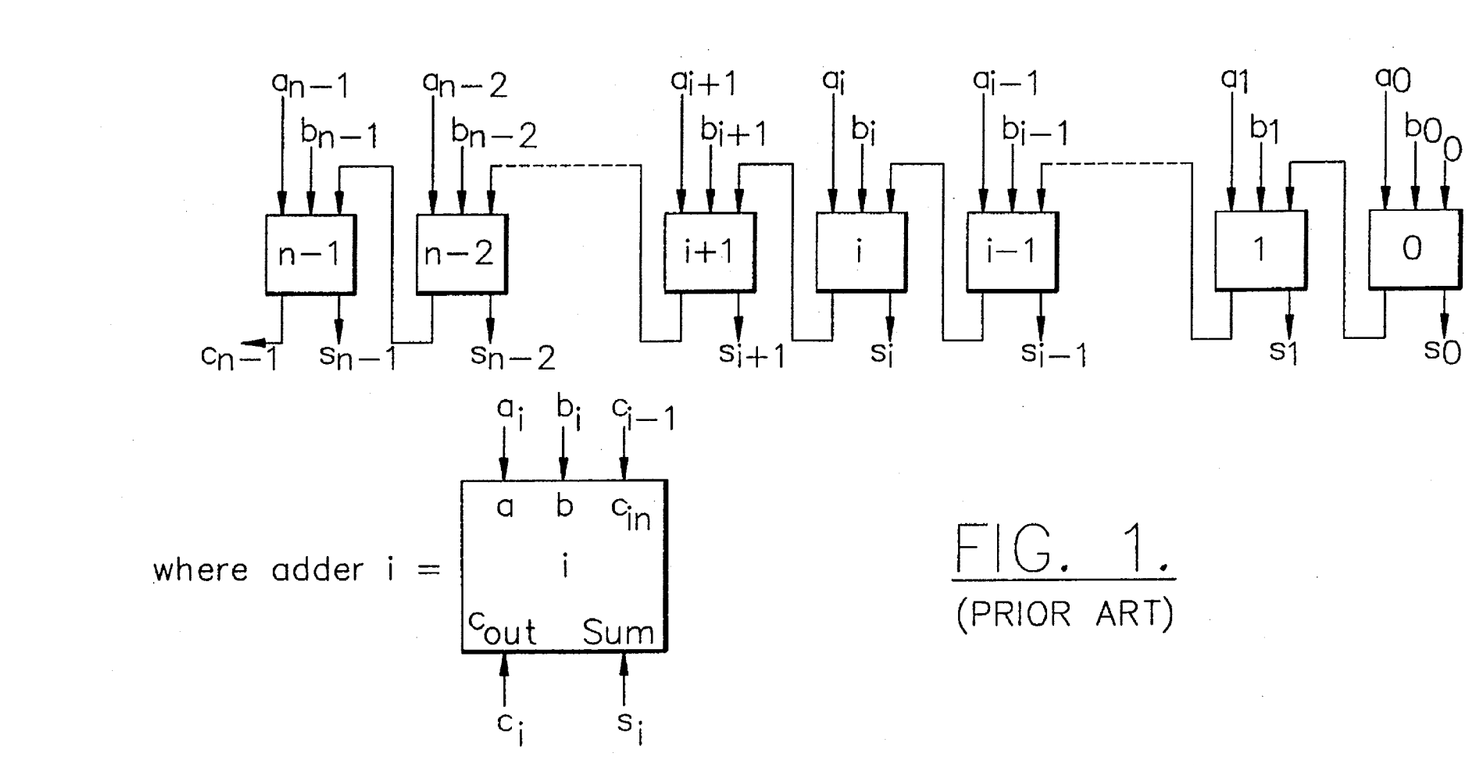
FIG. 1 schematically illustrates a prior art ripple adder which includes full-adder elements FIG. 2 schematically illustrates a prior art carry-lookahead adder.

Early microprocessor systems made use of classical adder designs, such as the ripple adder of FIG. 1, which is a reproduction of FIG. 2.2 from the textbook by J. Cavanagh, entitled *Digital Computer Arithmetic*, McGraw Hill, Inc. (1984), the disclosure of which is hereby incorporated herein by reference. Ripple adders are simple in design, require little electrical power and are easy to implement using conventional hardware, however, they are typically slow in their operation. This is because ripple adders have relatively long propagation paths extending from the least significant bit to the most significant bit position of the adder. Thus, a carry signal ("C") is propagated in a time proportional to the size of the adder and hence, the size of the binary operands being summed. As will be understood by those skilled in the art, the sum ("S") of two binary operands B1 and B2 of length N can be obtained using the following well known relationships:

$$S_i = B1_i \oplus B2_i \oplus C_i$$
$$C_{i+1} = B1_i B2_i \vee B1_i C_i \vee B2_i C_i = B1_i B2_i \vee P_i C_i$$

where, $C_0=0$; $i=(0,1,2,3,\ldots,N)$; $P_i=B1_i \oplus B2_i$; $\oplus$ is the XOR function; and $\vee$ is the OR function. Accordingly, if the propagation delay for each full-adder cell $i$ is "$\tau$" the amount of time required to add two N-bit operands using a ripple adder is approximately $N\tau$.

Figure 2:
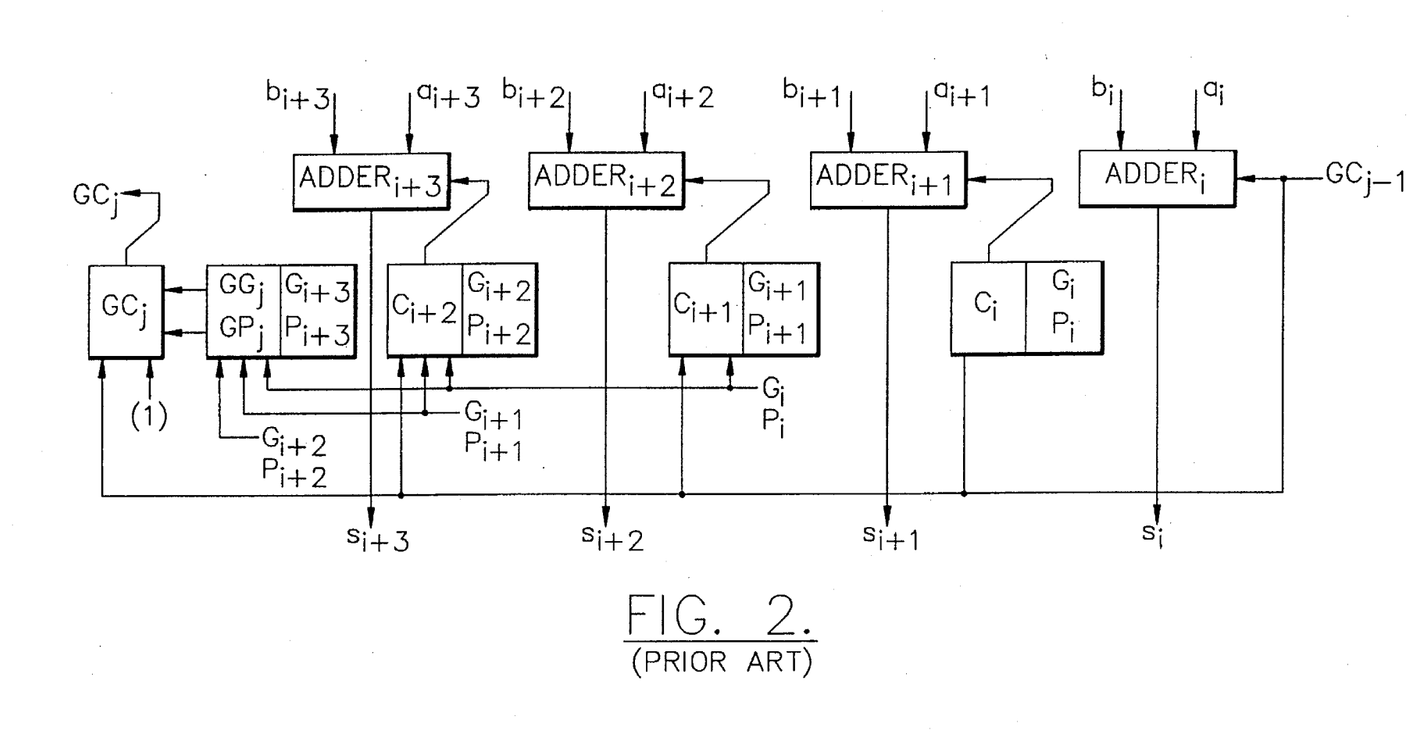

Many attempts have been made to increase the speed of arithmetic operations performed by general-purpose processors, based on a strategy of reducing the delay associated with carry propagation. One such attempt, commonly referred to as "carry-lookahead", is based on the principle that the carry-in signals for one or more higher-order adder stages can be generated directly from the inputs to the preceding lower-order stages without waiting for the carry-in signals to ripple through those stages. Adders designed using this technique are commonly referred to as "carry-lookahead adders" (CLA). An exemplary CLA, including circuitry for generating group-propagate and group-generate signals, is shown in FIG. 2. FIG. 2 is a reproduction of FIG. 2.5 from the aforementioned Cavanagh textbook.

As shown in FIG. 2, a conventional CLA looks at corresponding bit groups of two binary operands and generates a carry-out signal to the next higher order bit groups while the addition of the corresponding bit groups is performed to derive a sum. Thus, the generation of the carry-out signal occurs in parallel (i.e., simultaneously) with the generation of the sum bits. The lookahead circuitry reduces the need for rippling through every bit position and can reduce processing time to a value substantially below $N\tau$. There is, however, an area penalty caused by the additional lookahead circuitry. As will be understood by those skilled in the art, group propagate, group generate and the carry-out signal for a four-bit group can be provided by circuitry which performs the following logic functions:

$$p_{3:0} = p_3 p_2 p_1 p_0$$
$$g_{3:0} = g_3 \vee p_3 g_2 \vee p_3 p_2 g_1 \vee p_3 p_2 p_1 g_0$$
$$C_4 = g_{3:0} \vee p_{3:0} C_{in}$$

where $C_{in}$ is the carry-in to the four-bit group.

Figure 3:
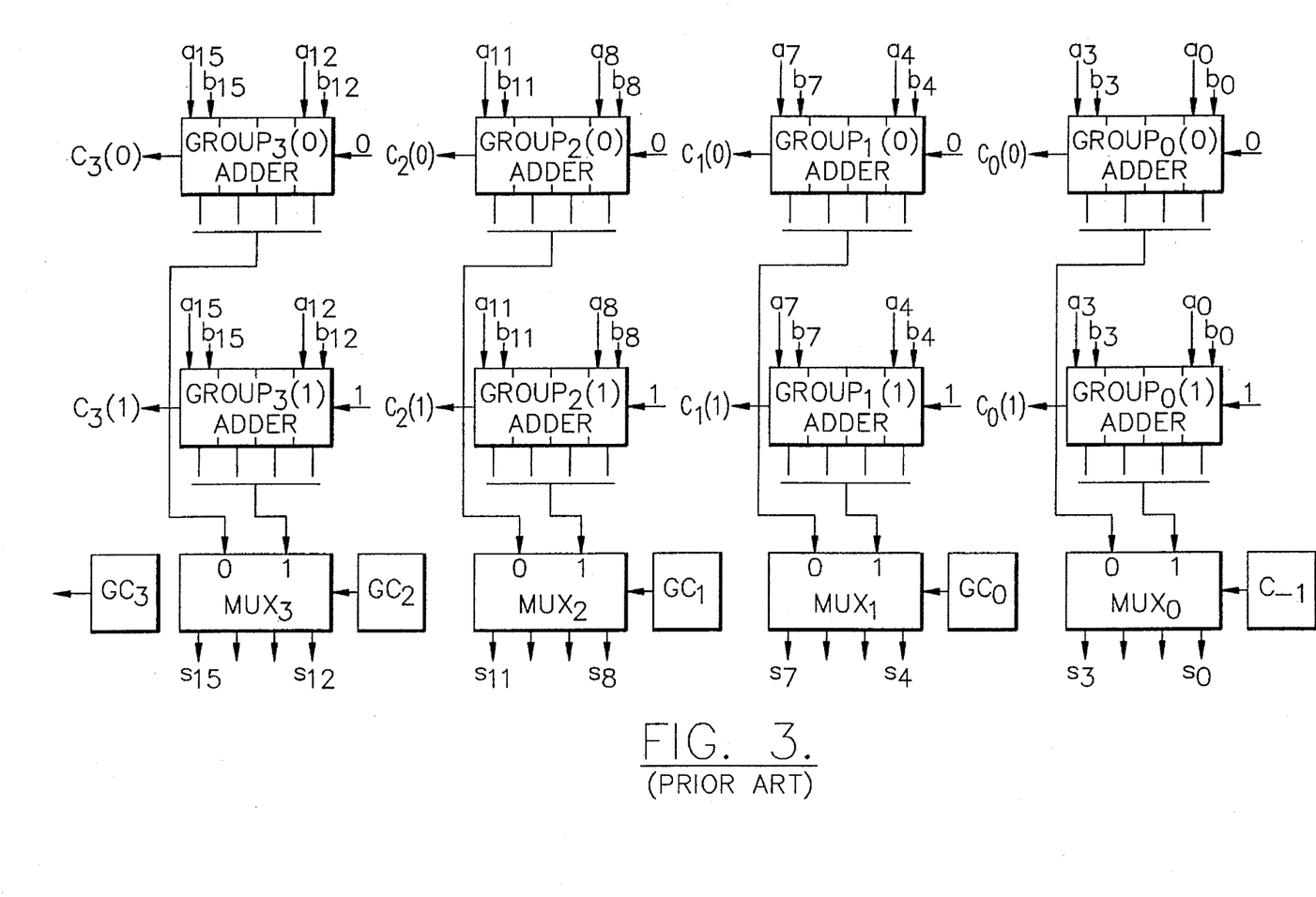
FIG. 3 schematically illustrates a 16-bit prior art carry-select adder.

Another known adder design for increasing the speed of binary summation is shown in FIG. 3, which is a reproduction of FIG. 2.10 from the aforementioned Cavanagh textbook. This adder includes pairs of group adder stages, as shown. One of each pair performs summation operations assuming a carry bit from the preceding stage and the other performs summation operations assuming the absence of a carry bit from the preceding stage. Group propagate and group generate signals, not shown, are also generated to derive the group carry bits $GC_0$, $GC_1$, $GC_2$, $GC_3$, as shown. The adder of FIG. 3 is commonly referred to by the acronym CSLA, because it combines features of conventional carry-select and carry-lookahead adders.

Figure 4:
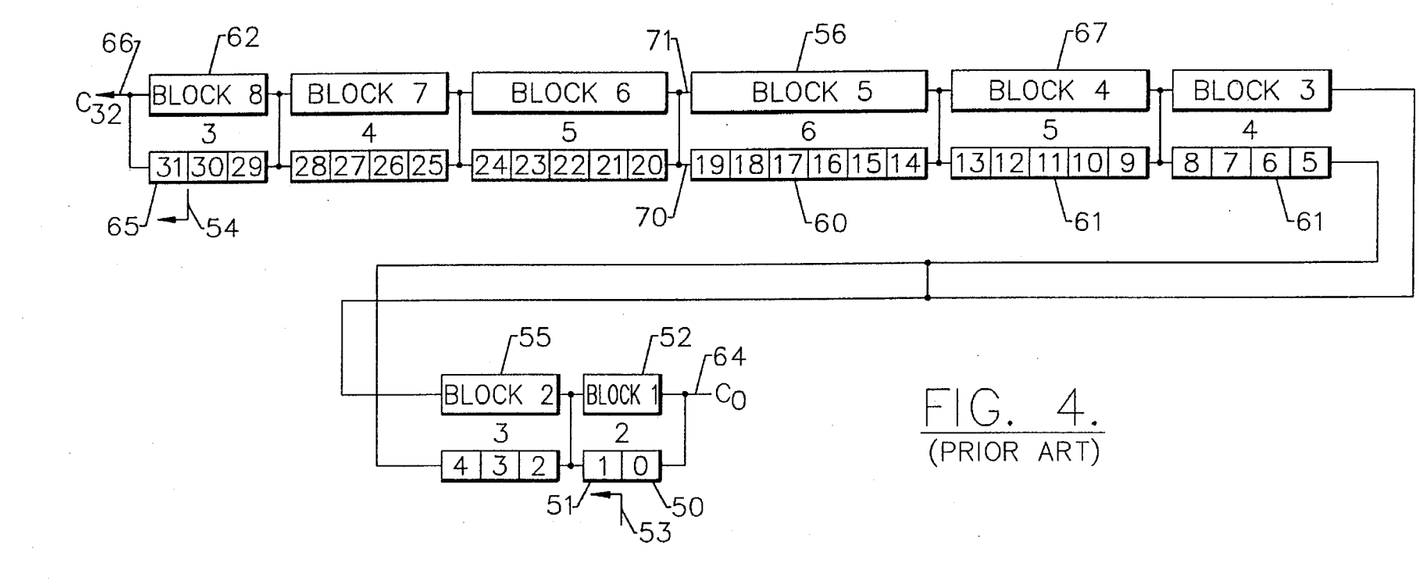
FIG. 4 schematically illustrates a prior art carry-lookahead adder, according to FIG. 5 of U.S. Pat. No. 4,737,926 to Vo et al.

The carry-lookahead adder of FIG. 4 is disclosed in U.S. Pat. No. 4,737,926, entitled *Optimally Partitioned Regenerative Carry Lookahead Adder*, to Vo et al. FIG. 4 is a reproduction of FIG. 5 from the Vo et al. patent, which is hereby incorporated herein by reference. FIG. 4 shows a 32-bit full adder 60 arranged in a cascaded ripple fashion with bit-0 adder 50 being the least significant bit (LSB) adder and bit-31 adder 65 being the most significant bit (MSB) adder. Each bit adder 61 includes a circuit for generating propagate and generate signals (not shown) to its respective lookahead carry generation block 67. Each lookahead block 67 is arranged in a cascaded fashion so as to accept a carry-in from the previous block and generate a carry-out to the next subsequent block.

The bit adders 61 are arranged in irregular groupings to reduce the time associated with the propagation of the carry from the LSB adder to the MSB adder. The grouping sequence is arranged by length from bit-31 to bit-0 as: {3 4 5 6 5 4 3 2}, with the smallest bit groupings being at the least significant and most significant bit positions. However, because of the cascaded arrangement, the propagation of the carry must still proceed serially through the blocks. As will be understood by those skilled in the art, the worst case propagation path extends from the second bit position (reference 53) to the last bit position (reference 54). The path includes bit stage 1, lookahead blocks 2 through 7 and bit stages 29 and 30. Accordingly, the adder of FIG. 4 has a worst case delay of T=2B+6L+1B, where B is the bit stage delay and L is the lookahead block delay. The speed of the Vo et al. 32-bit adder is therefore limited by the serial propagation of the carry through the 6 intermediate blocks.

Other attempts to design fast adders include the carry-skip adder disclosed in an article by A. Guyot, B. Hochet and J. Muller, entitled *A Way to Build Efficient Carry-Skip Adders*, IEEE Transactions on Computers, Vol. C-36, No. 10, October (1987). These adders comprise simple ripple adders with a plurality of speed-up carry chains (skip chains). The skip chains provide the feature whereby a carry into a block of full-adder cells can be bypassed to the next high order block if all the bits to be added in the block are different (i.e., if $p_i=1$ for all the cells in the block).

Figure 5A:
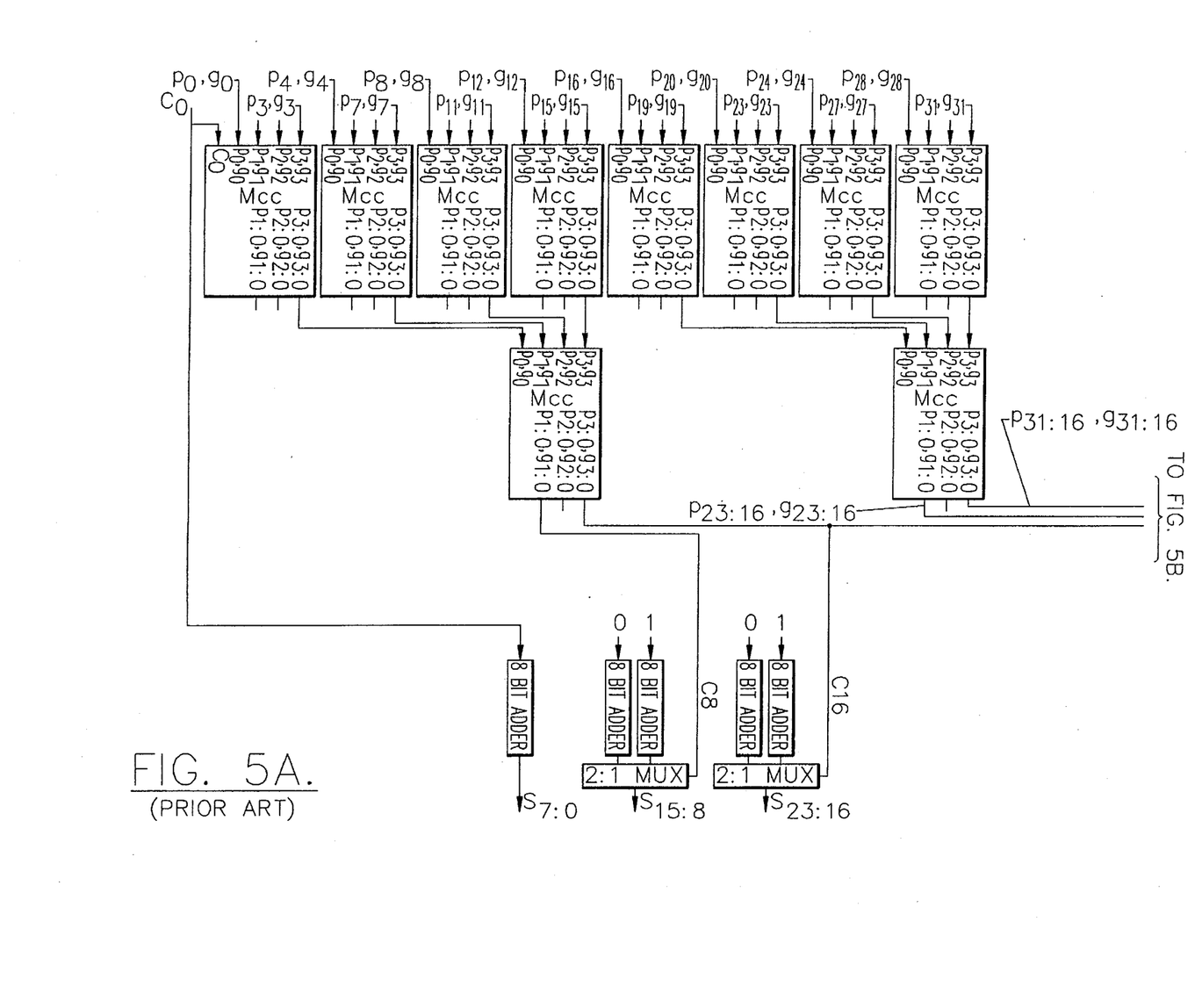
FIGS. 5A–B schematically illustrate a prior art redundant cell carry-lookahead adder.
Figure 5B:
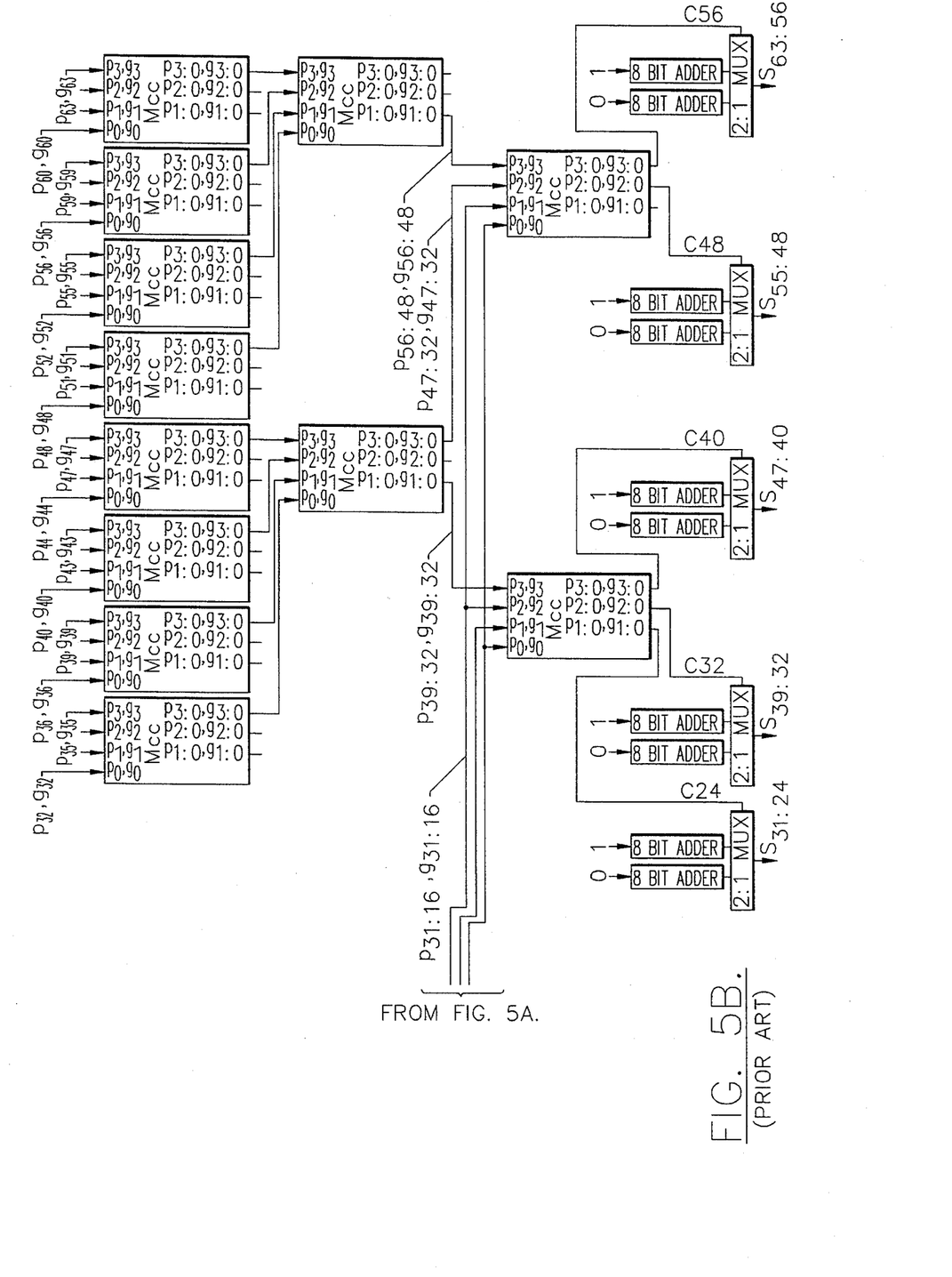
Figure 6:
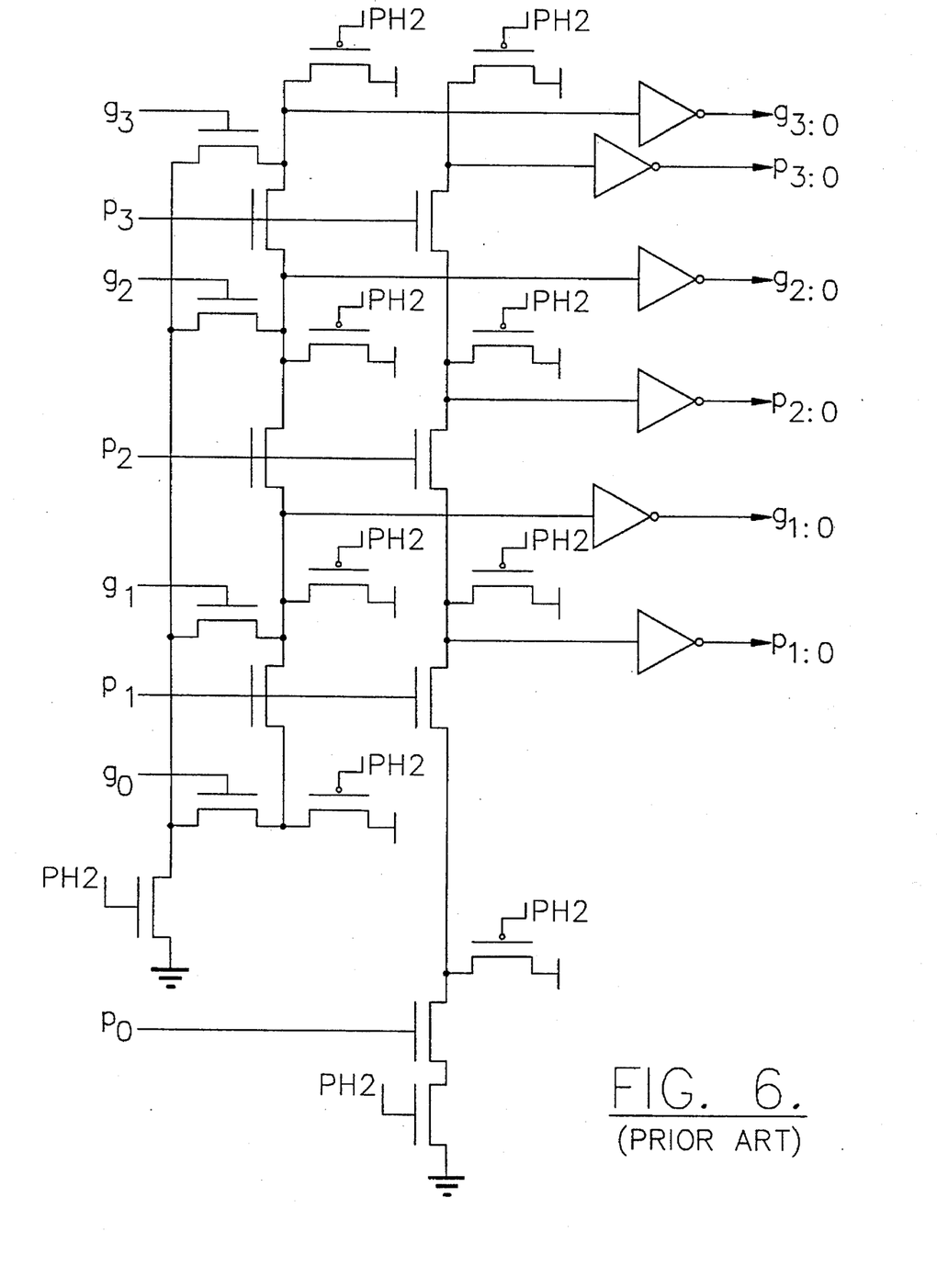
FIG. 6 schematically illustrates a prior art 4-bit Manchester carry-chain, having intermediate outputs.

Finally, FIGS. 5A and 5B illustrate a 56-bit adder used in the Advanced Micro Devices Am29050 microprocessor. The adder is described as a redundant cell carry-lookahead adder and is disclosed in an article by T. Lynch and E. Swartzlander, Jr., entitled "*A Spanning Tree Carry Lookahead Adder*, IEEE Transactions on Computers, Vol. 41, No. 8, August (1992). The adder uses a "tree" of 4-bit Manchester carry-chains ("Mcc"), having intermediate outputs, to generate carry signals into bit positions: 8,16,24,32,40,48 and 56. FIG. 6 schematically illustrates a 4-bit Mcc having intermediate outputs ($p_{1:0}$, $g_{1:0}$) and ($p_{2:0}$, $g_{2:0}$).

The adder also comprises pairs of 8-bit ripple adders for performing summation of 8-bit groups of the 56-bit binary operands to be summed. To achieve the carry-in signals at 8-bit intervals, the adder uses overlapping groups of carry-propagate and carry-generate signals, generated at the second and third tree levels, hence the term "redundant". These overlapping groups are generated at the intermediate outputs of the carry-chains. As will be understood by those skilled in the art, the use of carry-chains having intermediate outputs causes additional delay to the generation of the carry-in signals by providing additional loading to the higher level chains in the tree. Moreover, by using carry-chains of uniformly 4-bit length, the critical paths associated with the summation of each of the 8-bit groups of the 56-bit operands are of relatively nonuniform length. Thus, the sum bits for each of the consecutive 8-bit groups are not generated in the same amount of time.

Accordingly, notwithstanding the above-mentioned adder designs, there continues to be a need for fast binary adders, which are scalable and which have uniform carry-propagation delay times for performing carry-select and for generating groups of sum bits.

SUMMARY OF THE INVENTION

It is therefore an object of the present invention to provide an adder for performing summation of binary operands at a high rate of speed.

It is another object of the present invention to provide an adder which can be scaled to perform summation of binary operands of varying length.

It is a further object of the present invention to provide an adder wherein the critical path delays associated with the summation of respective portions of the binary operands to be added are of relatively uniform duration.

It is still a further object of the present invention to provide a binary adder which can be highly integrated on a semiconductor substrate.

These and other objects of the invention are provided by an adder which comprises a plurality of carry-lookahead cells of varying length at a first level and a carry-lookahead cell(s) at a second level, which is electrically connected to the outputs of the first level cells. The first level cells are also arranged in monotonically increasing order, by length. The second level cell(s) has an output for selecting one of a first or a second binary adder. The selection is based on the carry-propagate and carry-generate outputs generated by first level carry-lookahead cells. The first and second binary adders simultaneously perform binary summation of corresponding portions of the first and second binary operands. The first binary adder performs the summation assuming the presence of a binary carry into the least significant bits of the first and second binary operand portions and the second binary adder performs the summation assuming the absence of a binary carry into the least significant bits of the first and second binary operand portions. The first and second binary adders are typically binary ripple adders of conventional design. The adder of the present invention can be classified as a hybrid because it incorporates, among other things, (i) a carry-lookahead feature using first and second level carry-lookahead cells, and (ii) a carry-select feature, using the first and second binary adders.

However, in the preferred embodiment, the adder also incorporates a recursive feature for increasing the speed of summation. In this embodiment, each of the first and second binary ripple adders are replaced by an adder which includes the carry-lookahead and carry-select features of the invention, but on a smaller scale. Thus, in the recursive embodiment, each of the first and second binary adders comprises a plurality of carry-lookahead cells of varying length at a first binary adder level and a carry-lookahead cell at a second binary adder level, which is electrically connected to the outputs of the first binary adder level cells. Accordingly, the outputs of the second binary adder level cell depend on the carry-propagate and carry-generate outputs from the first binary adder level cells.

The first and second binary adders also comprise a plurality of pairs of smaller ripple adders connected (e.g., indirectly via a multiplexer) to the outputs of the second binary adder level cell. Each of these pairs of ripple adders generates sum bits corresponding to the summation of respective sub-portions of the first and second binary operands. One of each pair of the smaller ripple adders assumes the presence of a binary carry input (binary "1") and the corresponding other assumes the absence of a binary carry input (binary "0"), as described above with respect to the non-recursive embodiment. Accordingly, to perform the carry-select function, the cell at the second binary adder level generates a plurality of outputs to select those ripple adders which made the correct assumption.

For sake of clarity, it is helpful to conceptualize the first and second binary operands as being formed of a plurality of corresponding consecutively ordered bit groups (first, second, . . . ,nth). The bit groups for each operand extend from a least significant bit group (LSBG) to a most significant bit group (MSBG). Similarly, each bit group contains a plurality of consecutively ordered bits, extending from a least significant bit (LSB) to a most significant bit (MSB). In addition, groups of carry-propagate bits ($p_0, p_1, p_2, \ldots, p_n$) and carry-generate bits ($g_0, g_1, g_2, \ldots, g_n$) can be generated from each of the corresponding pairs of operand bit groups using known relationships. Moreover, each of the carry-propagate/carry-generate bit groups can be partitioned into corresponding subgroups: $\{((p_0,g_0)(p_1,g_1); (p_2,g_2)(p_3,g_3)(p_4,g_4); (p_5,g_4)(p_6,g_6)(p_7,g_7)(p_8, g_8); \ldots (p_n,g_n)\}$. It is at the subgroup level that the first plurality of carry-lookahead cells are arranged in monotonically increasing order, by length.

In particular, the adder of the present invention comprises a first and a second binary adder for performing binary summation of a second bit group of the first binary operand and a corresponding second bit group of the second binary operand, simultaneously. However, the first binary adder performs the summation assuming a binary carry into the least significant bits of the corresponding second bit groups and the second binary adder performs the summation assuming the absence of a binary carry into the least significant bits. Accordingly, each of the first and second binary adders generates a different set of sum bits. As will be understood by those skilled in the art, only one of the sets of sum bits will represent the correct summation, and it is the task of the rest of the adder to select the sum bits from the binary adder which assumed the proper carry input.

This task of selecting the appropriate binary adder is performed by the carry-lookahead section of the adder. This section comprises a first plurality of carry-lookahead cells, at least two of which are of different length. The first plurality of carry-lookahead cells are arranged in monotonically increasing order by length for each of the corresponding bit groups, from a least significant carry-lookahead cell to a most significant carry-lookahead cell. By using carry-lookahead cells of monotonically increasing length, the critical path delays associated with the summation of each of the corresponding bit groups (and subgroups) can be kept relatively uniform. In other words, carry-lookahead cells of monotonically increasing length are used so that each of the groups of the first and second binary operands can be added quickly and in approximately the same amount of time. The outputs of the first plurality of carry-lookahead cells at the first level are connected to a first carry-lookahead cell at a second level.

Based on the carry-generate and carry-propagate outputs of the first plurality of carry-lookahead cells, the second level carry-lookahead cell selects either the first or the second binary adder, depending on which generated the correct sum bits. As will be understood by those skilled in the art, the invention may also comprise a plurality of second level cells and one or more third level cells, etc. if the summation of operands having a relatively large number of bits is desired. For example, the invention can perform the summation of 56-bit operands using eleven (11) first level cells, three (3) second level cells and two (2) third level cells. The cells preferably comprise Manchester carry-chains. A 56-bit adder according to the present invention is ample for performing summation of the 52-bit mantissas of IEEE Standard-754 double-precision floating-point numbers.

Accordingly, a hybrid adder incorporating both carry-lookahead features and carry-select features is provided for performing fast summation of binary operands using carry-lookahead cells which are arranged, by length, in monotonically increasing order as a function of the significance (i.e., LSB→MSB) of the corresponding carry-propagate/carry-generate bit subgroups. The length of the carry-lookahead cells are arranged in monotonically increasing order at each level, in order to obtain critical path delays of relatively uniform duration. Calculation of the critical path delays associated with the summation of respective portions of the operands is based on a length$^2$ approximation. In particular, the delay corresponding to each path through the multiple levels of carry-lookahead cells is approximated by calculating the sum of the squares of the lengths of each cell in a respective path, as described more fully hereinbelow. This insures that each group of sum bits can be generated quickly and in approximately the same amount of time. The invention also incorporates a recursive feature for increasing the speed of summation even further.

DESCRIPTION OF PREFERRED EMBODIMENTS

The present invention will now be described more fully hereinafter with reference to the accompanying drawings, in which preferred embodiments of the invention are shown. This invention may, however, be embodied in different forms depending on the particular configuration or layout of the adder and should not be limited to the embodiments set forth herein. Rather, these embodiments are provided so that this disclosure will be thorough and complete, and will fully convey the scope of the invention to those skilled in the art. Like numbers refer to like elements throughout.

Figure 7:
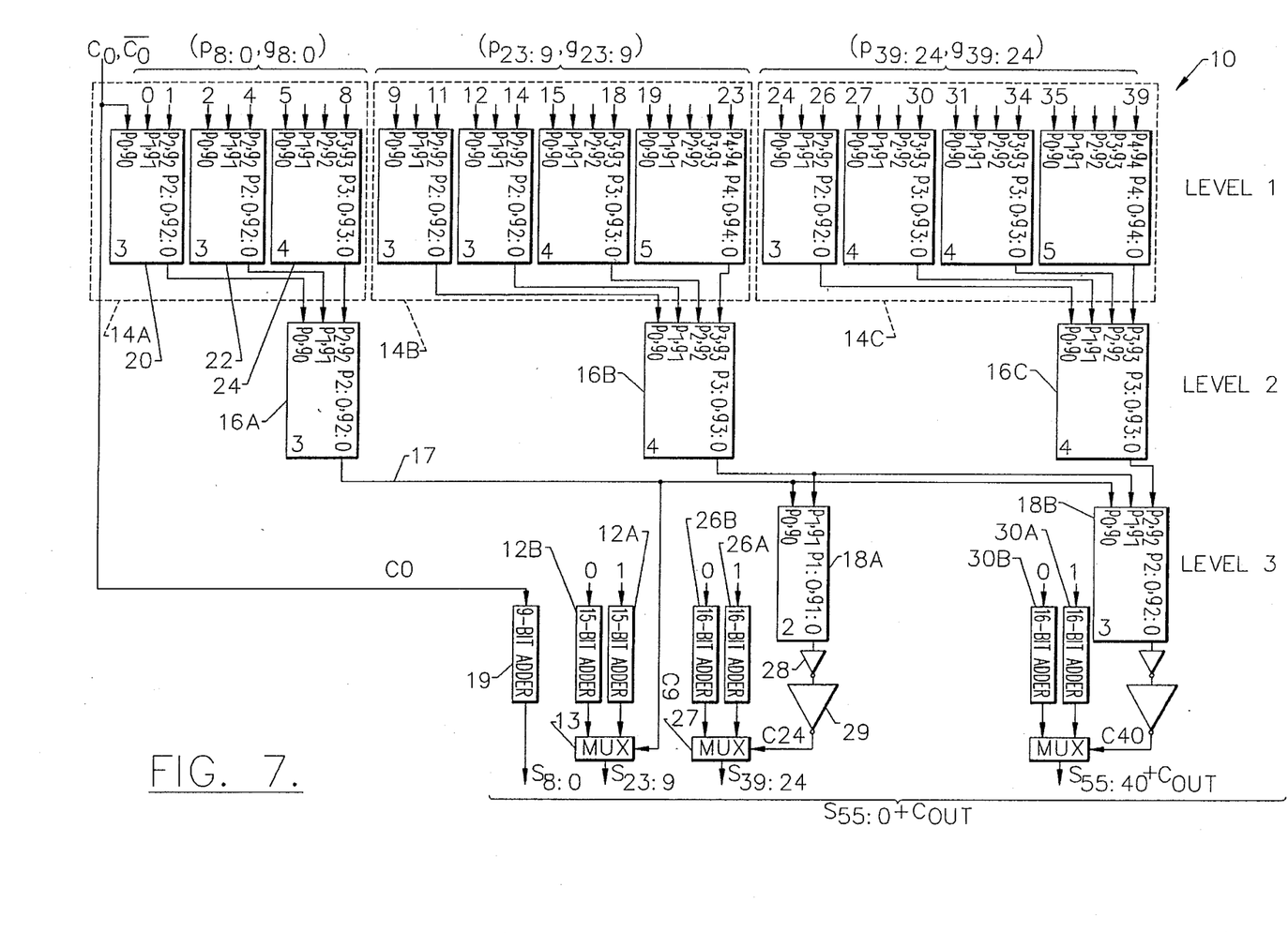
FIG. 7 schematically illustrates a carry-lockhead/carry-selected hybrid adder according to one embodiment of the present invention.

Referring now to FIG. 7, an adder for performing binary summation of a first 56-bit binary operand (Augend: $B1_{55:0}$) and a second 56-bit binary operand (Addend: $B2_{55:0}$), according to the present invention, will be described. The 56-bit adder 10 comprises a pair of 15-bit ripple adders 12A, 12B for performing binary summation of a second bit group of the first binary operand ($B1_{23:9}$) and a corresponding second bit group of the second binary operand ($B2_{23:9}$). The first 15-bit ripple adder 12a performs the summation assuming a binary carry (i.e., binary "1") into the least significant bits of the corresponding second bit groups ($B1_{23:9}$, $B2_{23:9}$) and the second 15-bit ripple adder 12b performs the summation assuming the absence of a binary carry (i.e., binary "0") into the least significant bits.

Figure 9:
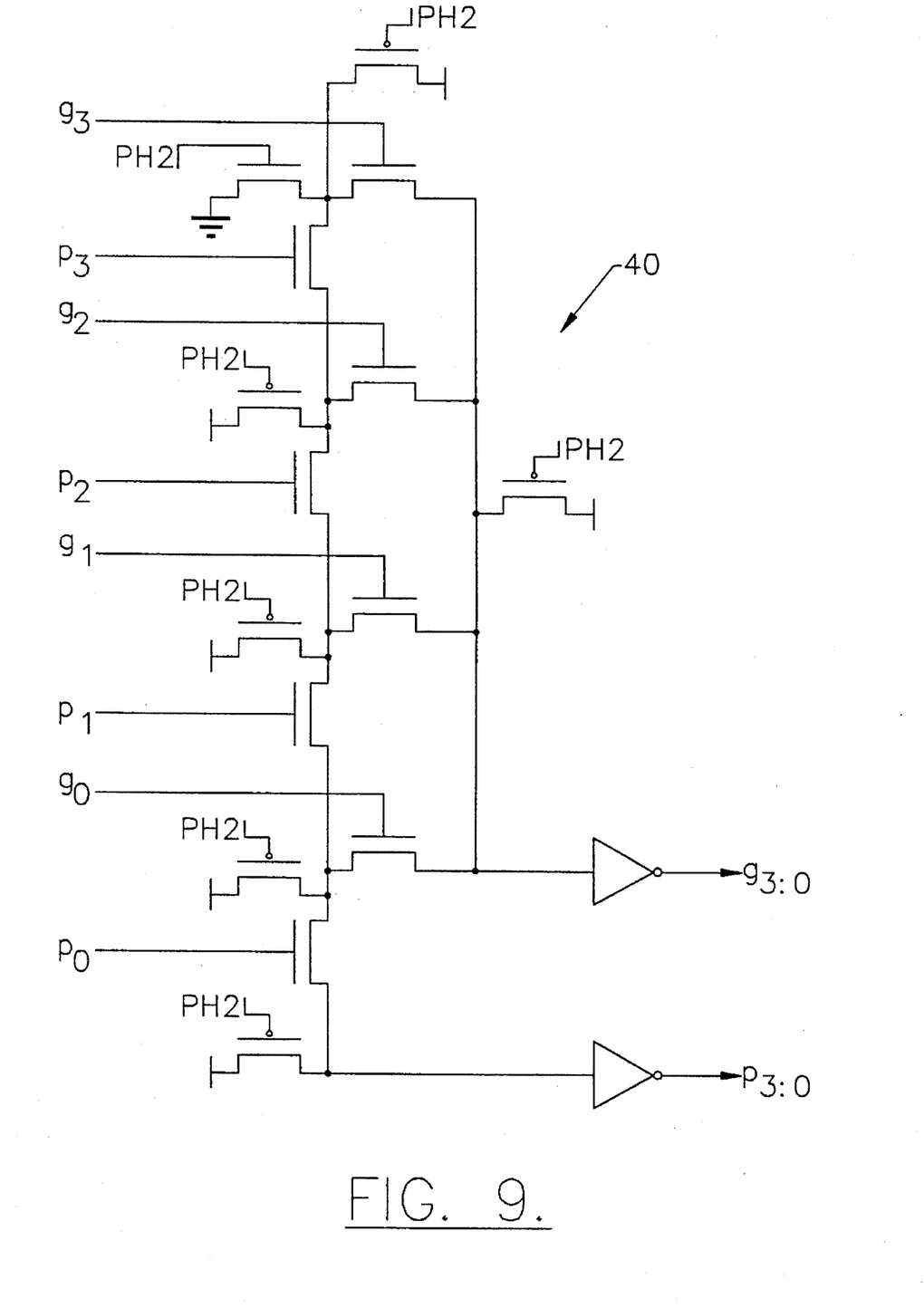
FIG. 9 schematically illustrates a 4-bit Manchester carry-chain having a single pair of carry-generate/carry-propagate outputs, according to the present invention.

The adder 10 further comprises a first, second and third plurality of carry-lookahead cells 14A–C at a first level and a plurality of carry-lookahead cells 16A–C and 18A–B at a second and third level, respectively. The cells preferably comprise Manchester carry chains, as shown in FIGS. 9 and 10, described hereinbelow. The first plurality of carry-lookahead cells 14a at the first level are arranged by length in monotonically increasing order from a least significant carry-lookahead cell 20 to a most significant carry-lookahead cell 24. As is well known to those having skill in the art, a monotonically increasing sequence is a sequence of successive terms ($a_i$, $a_{i+1}$, ..., $a_n$) where: $a_i \leq a_i+1 ... a_n$.

As shown, the lengths of cells 20, 22 and 24 are: 3, 3, and 4, which means that cell 22 receives three pairs of carry-propagate/carry-generate bits, derived from ($B1_{4:2}$, $B2_{4:2}$) and cell 24 receives four pairs derived from ($B1_{8:5}$, $B2_{8:5}$). Similarly, the second and third plurality of cells 14B and 14C are also arranged in monotonically increasing order, by length, as shown. The lengths of the cells are chosen so that the critical path delays associated with the summation of each of the groups (and subgroups) of $B1_{55:0}$ and $B2_{55:0}$ are relatively uniform. As will be understood by those skilled in the art, the carry-generate signal delay through the Manchester carry-chains of the present invention is quadratically proportional to the cell's length (i.e., length$^2$). A thorough description of the quadratic carry-generate delay can be found in an article by P. Chan and M. Schlag, entitled *Analysis and Design of CMOS Manchester Adders with Variable Carry-Skip*, IEEE Transactions on Computers, Vol. 39, No. 8, August (1990), the disclosure of which is hereby incorporated herein by reference. Accordingly, the delay corresponding to each path through the multiple levels of Manchester carry-chains can be approximated as being proportional to the sum of the squares of the lengths of each cell in a respective path. For example, the delay associated with one of the longest paths from the input at bit position 9 to the output of cell 18B is approximately equal to 29 ($3^2+4^2+2^2$). Similarly, the delays associated with the paths from input positions $C_0$, 5, 15, 27 and 35 to the output of cell 18B are relatively uniform and are 27 ($3^2+3^2+3^2$), 26 ($4^2+1^2+3^2$), 24 ($4^2+2^2+2^2$), 26 ($4^2+3^2+1^2$) and 27 ($5^2+1^2+1^2$), respectively.

A carry-lookahead cell 16A is also provided at the second level and is connected to each of the pairs of carry-propagate/carry-generate outputs of the first plurality of cells 14A. The cell 16A selects either the first ripple adder 12A or the second ripple adder 12B, based on the actual binary carry into the least significant bits ($B1_9$, $B2_9$) of the corresponding second bit groups ($B1_{23:9}$, $B2_{23:9}$). Cell 16A produces a pair of bits ($p_{8:0}$, $g_{8:0}$) at output line 17. The actual binary carry ($C_9$) equals $g_{8:0}$. A multiplexer 13 (MUX) is provided for transferring the sum bits $S_{23:9}$ generated by the selected adder to the output. The sum bits $S_{23:9}$ represent the binary summation of the corresponding second bit groups ($B1_{23:9}$, $B2_{23:9}$), including the actual binary carry out of the ninth bits ($B1_8$, $B2_8$). But, because of the carry-lookahead feature, the summation of bit groups ($B1_{8:0}$, $B2_{8:0}$), ($B1_{23:9}$, $B2_{23:9}$), ($B1_{39:41}$, $B2_{39:24}$) and ($B1_{55:40}$, $B2_{55:40}$), as shown, occurs in parallel. Thus, sum bits $S_{23:9}$ are processed before summation by the 9-bit ripple adder 19 is complete. Likewise, sum bits $S_{39:24}$ and $S_{55:40}$ are processed before summation by the 15-bit adders 12A–B and 16-bit adders 26A–B is complete. Moreover, by arranging the carry-lookahead cells in monotonically increasing order, by length, sum bits ($S_{55:40}$, $S_{39:24}$, $S2_{23:9}$ and $S_{8:0}$) can be processed quickly and in approximately the same amount of time.

As will be understood by those skilled in the art, each of the inputs to the first level cells 14A–C are two-bits wide and include the carry-propagate and carry-generate bits from the set $\{(p_0, g_0), (p_1, g_1), \ldots, (p_{39}, g_{39})\}$. These propagate and generate bit pairs are generated by conventional circuits, not shown, which perform the following logic functions:

$$g_i = B1_{i,z} \vee B2_i \quad (1)$$

$$p_i = B1_i \oplus B2_i \quad (2)$$

where i=0,1,2,... 39.

Referring still to FIG. 7, the adder 10 further comprises a second pair of binary adders 26A and 26B. These adders perform binary summation of a third bit group of the first binary operand ($B1_{39:24}$) and a corresponding third bit group of the second binary operand ($B2_{39:24}$). Adder 26A assumes the presence of a binary carry and adder 26B assumes the absence of a binary carry, as shown. Carry-lookahead cells 16A and 16B which produce outputs ($p_{8:0}$, $g_{8:0}$) and ($p_{23:9}$, $g_{23:9}$) collectively select binary adder 26A or 26B, based on the actual binary carry ($C_{24}$) into the least significant bits of the corresponding third bit groups ($B_{39:24}$, $B2_{39:24}$). Cell 18A is provided for generating $C_{24}$ (i.e., $g_{23:0}$) from the inputs ($p_{8:0}$, $g_{8:0}$) and ($p_{23:9}$, $g_{23:9}$). Inverting buffers 28 and 29 are also provided for driving multiplexer 27. The size of each these cascaded inverting buffers is preferably dictated by the designs considerations set forth in a textbook by C. Mead and L. Conway, entitled *Introduction to VLSI Systems*, Addison-Wesley (1980), the disclosure of which is hereby incorporated herein by reference.

Similarly, a third pair of binary adders 30A and 30B are also provided for performing binary summation of a fourth bit group of the first binary operand ($B1_{55:40}$) and a corresponding fourth bit group of the second binary operand ($B2_{55:40}$). Carry-lookahead cells 16A–16C, which produce outputs ($p_{8:0}g_{8:0}$), ($P_{23:9}$, $g_{29:3}$) and ($p_{39:24}$, $g_{39:24}$), collectively select binary adder 30A or 30B, based on the actual binary carry ($C_{40}$) into the least significant bits of the corresponding fourth bit groups ($B1_{55:40}$, $B2_{55:40}$). Cell 18B is provided for generating $C_{40}$ (i.e., $g_{39:0}$).

Figure 8:
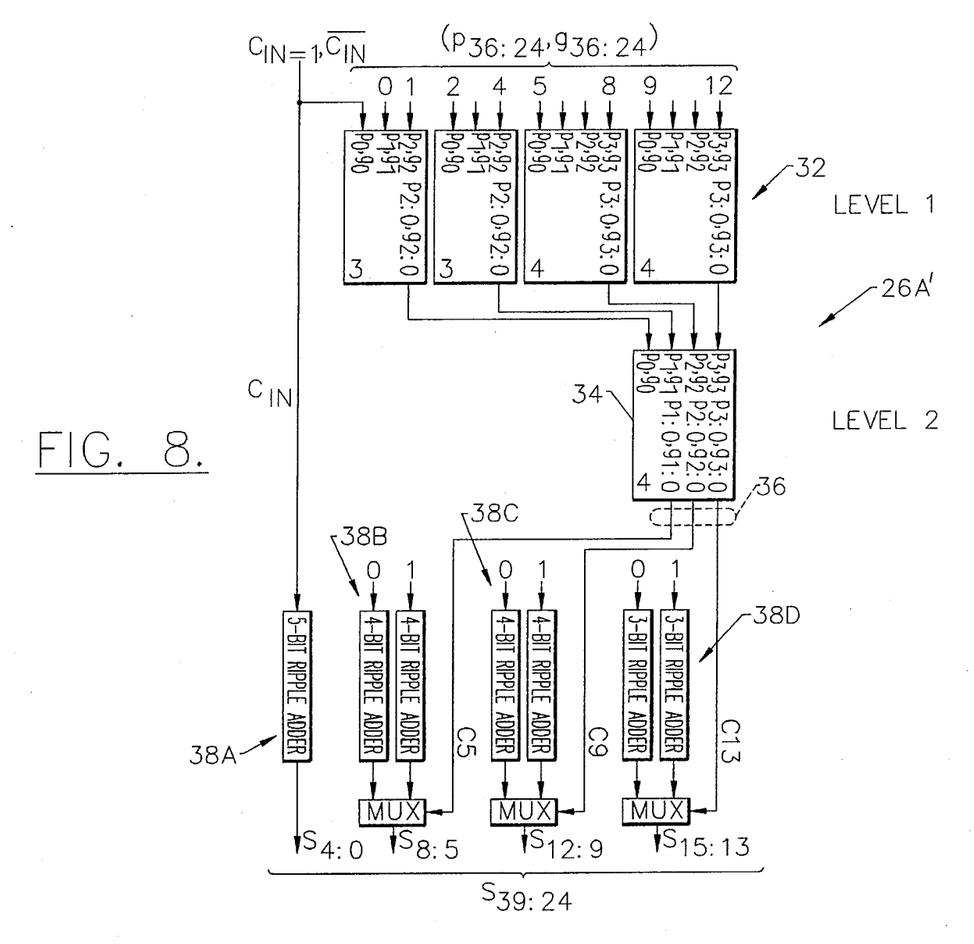
FIG. 8 schematically illustrates a carry-locked/carry-selected hybrid adder according to a preferred embodiment of the present invention.

Referring now to FIG. 8, the preferred recursive embodiment of the present invention will be described. In the recursive embodiment, one or more of the binary adders 19, 12A–B, 26A–B and 30A–B may be configured as shown in FIG. 8. However, for purposes of explanation, the adder 26' of FIG. 8 is configured to replace the 16-bit binary adder 26A of FIG. 7. Accordingly, adder 26' receives carry-propagate/carry-generate bits from the set ($p_{36:24}$, $g_{36:24}$) and generates sum bits $S_{39:24}$. In particular, adder 26' comprises a plurality of carry-lookahead cells 32 at a first binary adder level. At least two of the cells 32 are of different length. A carry-lookahead cell 34 at a second binary adder level is also provided. Cells 32 preferably comprise Manchester carry-chains having a single carry-propagate and carry-generate output signal line as schematically illustrated by FIG. 9. However, cell 34 preferably comprises a Manchester carry-chain having intermediate outputs 36. Cell 34 is schematically illustrated by FIG. 6.

The cell 26' further comprises ripple adder 38A and a plurality of pairs of ripple adders 38B–D. Adder 38A performs the summation of operand bits ($B1_{28:24}$, $B2_{28:24}$) and adders 38B–D respectively perform the summation of operand bits ($B1_{39:29}$, $B2_{32:29}$), ($B1_{33:36}$, $B2_{33:36}$) and ($B1_{39:37}$, $B2_{39:37}$). The recursive embodiment is preferred because the adder 26' of FIG. 8 can perform a 16-bit summation using ripple adders of approximately 4-bit length, operating in parallel, instead of a single 16-bit ripple adder operating in series, which requires more time. However, the area penalty is higher for the recursive embodiment, because of the additional logic which is required to perform the carry-lookahead and carry-select features.

Referring now to FIG. 9, a 4-bit Manchester carry-chain 40 for generating group-propagate/group-generate signals for 4-bit groups (($p_0, g_0$), $p_1$, $g_1$, ($p_2$, $g_2$), ($P_3, g_3$)) will be described. The chain 40 does not include intermediate outputs, but produces a single pair of group propagate/generate signals ($p_{3:0}$, $g_{8:0}$). As will be understood by those skilled in the art, the chain 40 performs the following logic functions:

$$P_{3:0} = P_3 p_2 p_1 P_0 \quad (3)$$

$$_{3:0} = g_3 \vee p_3 g_2 \vee p_3 p_2 g_1 \vee p_3 p_2 p_1 p_0 \quad (4)$$

Accordingly, the adder of the present invention generates group carry-propagate and group carry-generate signals, in parallel, from carry-chains of varying length. The carry-chains provide a single pair of carry/generate outputs which can be combined with the outputs of one or more other cells, for performing the carry-select operations. The adder does not require overlapping groups of carry/generate outputs and does not require Manchester carry chains having intermediate outputs, except one such chain in the recursive embodiment (shown as cell 34). The recursive embodiment can be used to eliminate the need for 16-bit ripple adders, which That which is claimed is:

1. An adder for performing binary summation of a first binary operand and a second binary operand, said operands formed by a plurality of consecutively ordered bit groups, extending from a least significant bit group to a most significant bit group and including a first bit group and a more significant second bit group, said bit groups containing a plurality of consecutively ordered bits therein, extending from a least significant bit to a most significant bit, comprising:

a first and a second binary adder for performing binary summation of the second bit group of said first binary operand and the second bit group of said second binary operand, wherein said first binary adder performs the summation assuming a binary carry into the least significant bits of said corresponding second bit groups, and wherein said second binary adder performs the summation assuming the absence of a binary carry into the least significant bits of said corresponding second bit groups;

a first plurality of carry-lookahead cells at a first level, at least two of which are of different length, said first plurality of carry-lookahead cells each having inputs and arranged in monotonically increasing order by length, from a least significant carry-lookahead cell to a most significant carry-lookahead cell which has a length greater than the length of the least significant carry-lookahead cell, irrespective of the actual length of the least significant carry-lookahead cell of said first plurality of carry-lookahead cells; and a first carry-lookahead cell at a second level and having inputs connected to the outputs of said first plurality of carry-lookahead cells and having an output for selecting one of said first and said second binary adders, based on an actual binary carry into the least significant bits of said corresponding second bit groups;

wherein the inputs of said first plurality of carry-lookahead cells receive a first group of carry-propagate bits and a corresponding first group of carry-generate bits;

wherein said first group of carry-propagate bits and said corresponding first group of carry-generate bits are derived from the first bit groups of said first and second binary operands using predetermined propagate and generate logic functions, respectively, and include consecutively ordered and non-overlapping subgroups of bits, extending from a least significant bit subgroup to a most significant bit subgroup having a greater number of bits therein than the least significant bit subgroup;

wherein the inputs of the least significant carry-lookahead cell of said first plurality of carry-lookahead cells receive the least significant bit subgroups of said first group of carry-propagate bits and said corresponding first group of carry-generate bits;

wherein the inputs of the most significant carry-lookahead cell of said first plurality of carry-lookahead cells receive the most significant bit subgroups of said first group of carry-propagate bits and said corresponding first group of carry-generate bits; and wherein each of said first plurality of carry-lookahead cells has only one output connected to an input of said first carry-lookahead cell at a second level.

2. The adder of claim 1, wherein said first plurality of carry-lookahead cells comprises Manchester carry-chains.

3. The adder of claim 2, wherein said Manchester carry-chains contain a single carry-propagate output signal line and a single carry-generate output signal line.

4. The adder of claim 1, further comprising a second plurality of carry-lookahead cells at the first level, at least two of which are of different length, said second plurality of carry-lookahead cells each having inputs and at least one output and arranged in monotonically increasing order by length from a least significant carry-lookahead cell to a most significant carry-lookahead cell which has a length greater than the length of the least significant carry-lookahead cell of said second plurality of carry-lookahead cells, irrespective of the actual length of the least significant carry-lookahead cell of said second plurality of carry-lookahead cells.

5. The adder of claim 4, wherein said second plurality of carry-lookahead cells have inputs for receiving a second group of carry-propagate bits and a corresponding second group of carry-generate bits, and wherein said second group of carry-propagate bits and said corresponding second group of carry-generate bits are derived from the second bit groups of said first and second binary operands using the predetermined propagate and generate logic functions, respectively.

6. The adder of claim 5, further comprising a second carry-lookahead cell at said second level connected to said second plurality of carry-lookahead cells, wherein said first and said second carry-lookahead cells at said second level comprise carry-chains having lengths arranged in monotonically increasing order from said first carry-lookahead cell at said second level to said second carry-lookahead cell at said second level.

7. The adder of claim 6, wherein said first binary adder and said second binary adder comprise binary ripple adders.

8. The adder of claim 5, wherein said second group of carry-propagate bits and said corresponding second group of carry-generate bits include consecutively ordered subgroups of bits, extending from a least significant bit subgroup to a most significant bit subgroup having a greater number of consecutively ordered bits included therein;

wherein the inputs of the least significant carry-lookahead cell of said second plurality of carry-lookahead cells receive the least significant bit subgroups of said second group of carry-propagate bits and said corresponding second group of carry-generate bits; and wherein the inputs of the most significant carry-lookahead cell of said second plurality of carry-lookahead cells receive the most significant bit subgroups of said second group of carry-propagate bits and said corresponding first group of carry-generate bits.

9. The adder of claim 8, wherein said second plurality of carry-lookahead cells at said first level comprise Manchester carry-chains.

10. The adder of claim 8, wherein said most significant bit subgroups of said corresponding second groups of said carry-propagate bits and said carry-generate bits have a greater number of consecutively ordered bits included therein than said most significant bit subgroups of said corresponding first groups of said carry-propagate bits and said carry-generate bits.

11. The adder of claim 10, wherein said least significant bit subgroups of said corresponding second groups of said carry-propagate bits and said carry-generate bits and said least significant bit subgroups of said corresponding first groups of said carry-propagate bits and said carry-generate bits have an equal number of consecutively ordered bits included therein.

12. An adder for performing binary summation of a first binary operand and a second binary operand, said operands formed by a plurality of consecutively ordered bit groups, extending from a least significant bit group to a most significant bit group, said bit groups containing a plurality of consecutively ordered bits therein, extending from a least significant bit to a most significant bit, comprising:

a first plurality of carry-lookahead cells at a first level, at least two of which are of different length, said first plurality of carry-lookahead cells at a first level having inputs for receiving a first group of carry-propagate bits and for receiving a corresponding first group of carry-generate bits, said corresponding first groups of said carry-propagate bits and said carry-generate bits being derived from a first bit group of said first binary operand and a first bit group of said second binary operand using predetermined propagate and generate logic functions, and wherein said corresponding first groups of said carry-propagate bits and said carry-generate bits include consecutively ordered and non-overlapping subgroups of bits, extending from a least significant bit subgroup to a most significant bit subgroup having a greater number of consecutively ordered bits included therein, irrespective of the actual number of bits in the corresponding least significant bit subgroup, said first plurality of carry-lookahead cells being arranged so that the least significant bit subgroups of said corresponding first groups of said carry-propagate bits and said carry-generate bits are inputs to one of said first plurality of carry-lookahead cells and the most significant bit subgroups of said corresponding first groups of said carry-propagate bits and said carry-generate bits are inputs to another of said first plurality of carry-lookahead cells of greater length;

a second plurality of carry-lookahead cells at the first level, at least two of which are of different length, said second plurality of carry-lookahead cells at the first level having inputs for receiving a second group of carry-propagate bits and for receiving a corresponding second group of carry-generate bits, said corresponding second groups of said carry-propagate bits and said carry-generate bits being derived from a second bit group of said first binary operand and a second bit group of said second binary operand, and wherein said corresponding second groups of said carry-propagate bits and said carry-generate bits include consecutively ordered and non-overlapping subgroups of bits, extending from a least significant bit subgroup to a most significant bit subgroup having a greater number of consecutively ordered bits included therein, irrespective of the actual number of bits in the corresponding least significant bit subgroup, said second plurality of carry-lookahead cells being arranged so that the least significant bit subgroups of said corresponding second groups of said carry-propagate bits and said carry-generate bits are inputs to one of said second plurality of carry-lookahead cells and the most significant bit subgroups of said corresponding second groups of said carry-propagate bits and said carry-generate bits are inputs to another of said second plurality of carry-lookahead cells of greater length;

a first pair of binary adders for respectively performing binary summation of a said corresponding second bit groups, wherein one of said first pair of binary adders performs the summation assuming a carry into the least significant bits of said corresponding second bit groups, and wherein the other of said first pair of binary adders performs the summation assuming the absence of a binary carry into the least significant bits of said corresponding second bit groups;

a second pair of binary adders for respectively performing binary summation of a third bit group of said first binary operand and a corresponding third bit group of said second binary operand, wherein the least significant bits of said corresponding third bit groups are more significant than the most significant bits of said corresponding second bit groups, and wherein one of said second pair of binary adders performs the summation assuming a carry into the least significant bits of said corresponding third bit groups and the other of said second pair of binary adders performs the summation assuming the absence of a binary carry into the least significant bits of said corresponding third bit groups;

a first carry-lookahead cell at a second level connected to said first plurality of carry-lookahead cells and having an output for selecting one of said first pair of binary adders, based on an actual binary carry into the least significant bits of said corresponding second bit groups;

a second carry-lookahead cell at said second level connected to said second plurality of carry-lookahead cells and having and output for selecting, in conjunction with said output of said first carry-lookahead cell, one of said second pair of binary adders, based on an actual binary carry into the least significant bits of said corresponding third bit groups;

wherein said first and second carry-lookahead cells at a second level each have inputs;

wherein each of said first plurality of carry-lookahead cells at a first level has only one output connected to an input of said first carry-lookahead cell at a second level; and wherein each of said second plurality of carry-lookahead cells at a first level has only one output connected to an input of said second carry-lookahead cell at a second level.

13. The adder of claim 12, wherein the length of said second carry-lookahead cell at said second level is greater than the length of said first carry-lookahead cell at said second level.

14. The adder of claim 12, wherein the most significant bit subgroups of said corresponding second groups of said carry-propagate bits and said carry-generate bits include a greater number of consecutively ordered bits therein than the most significant bit subgroups of said corresponding first groups of said carry-propagate bits and said carry-generate bits.

15. The adder of claim 14, wherein said first carry-lookahead cell, said second carry-lookahead cell, said first plurality of carry-lookahead cells and said second plurality of carry-lookahead cells comprise Manchester carry-chains.

16. The adder of claim 15, wherein said Manchester carry-chains contain a single carry-generate output signal line and a single carry-propagate output signal line.

17. The adder of claim 15, wherein the lengths of said Manchester carry-chains, which comprise said first plurality of carry-lookahead cells, are arranged in monotonically increasing order from a least significant Manchester carry-chain, having inputs for receiving said least significant bit subgroups of said corresponding first groups of said carry-propagate bits and said carry-generate bits, to a most significant Manchester carry-chain, having inputs for receiving said most significant bit subgroups of said corresponding first groups of said carry-propagate bits and said carry-generate bits, wherein the lengths of said Manchester carry-chains which comprise said second plurality of carry-lookahead cells, are arranged in monotonically increasing order from a least significant Manchester carry-chain, having inputs for receiving said least significant bit subgroups of said corresponding second groups of said carry-propagate bits and said carry-generate bits, to a most significant Manchester carry-chain, having inputs for receiving said most significant bit subgroups of said corresponding second groups of said carry-propagate bits and said carry-generate bits, wherein the length of the most significant Manchester carry-chain of said first plurality of carry-lookahead cells is greater than the length of the corresponding least significant Manchester carry-chain of said first plurality of carry-lookahead cells, irrespective of the actual length of the corresponding least significant Manchester carry-chain, and wherein the length of the most significant Manchester carry-chain of said second plurality of carry-lookahead cells is greater than the length of the corresponding least significant Manchester carry-chain of said second plurality of carry-lookahead cells, irrespective of the actual length of the corresponding least significant Manchester carry-chain.

18. An adder for performing binary summation of a first binary operand and a second binary operand, said operands formed by a plurality of consecutively ordered bit groups, extending from a least significant bit group to a most significant bit group and including a first bit group and a more significant second bit group, said bit groups containing a plurality of consecutively ordered bits therein, extending from a least significant bit to a most significant bit, comprising:

a first and a second binary adder for performing binary summation of the second bit group of said first binary operand and the corresponding second bit group of said second binary operand, wherein said first binary adder performs the summation assuming a binary carry into the least significant bits of said corresponding second bit groups, and wherein said second binary adder performs the summation assuming the absence of a binary carry into the least significant bits of said corresponding second bit groups;

a first plurality of carry-lookahead cells at a first level and having inputs and at least one output, said first plurality of carry-lookahead cells being selected so that at least two of them are of different length and have a corresponding different number of inputs;

a second plurality of carry-lookahead cells at said first level and having inputs and at least one output, said second plurality of carry-lookahead cells being selected so that at least two of them are of different length and have a corresponding different number of inputs;

wherein the length of at least one of said second plurality of carry-lookahead cells is greater than the length of at least one of said first plurality of carry-lookahead cells, irrespective of the actual length of said at least one of said first plurality of carry-lookahead cells;

wherein the inputs of said first and said second plurality of carry-lookahead cells at said first level receive a first group of carry-propagate bits and a corresponding first group of carry-generate bits, and wherein said first groups of said corresponding carry-propagate bits and said carry-generate bits are derived from the first bit group of said first binary operand and the corresponding first bit group of said second binary operand using predetermined propagate and generate logic functions; and a first plurality of carry-lookahead cells at a second level, at least two of which are of different length and have a corresponding different number of inputs, connected to the outputs of said first and said second plurality of carry-lookahead cells at said first level, wherein said first plurality of carry-lookahead cells at said second level have outputs for selecting one of said first and second binary adders, based on an actual binary carry into the least significant bits of said corresponding second bit groups; and wherein each of said first and second plurality of carry-lookahead cells has only one output connected to an input of said first plurality of carry-lookahead cells at a second level.

19. The adder of claim 18, wherein each of said first group of carry-propagate bits and said corresponding first group of carry-generate bits include consecutively ordered subgroups of bits, extending from a least significant bit subgroup to a most significant bit subgroup, and wherein the most significant bit subgroup includes a greater number of consecutively ordered bits than said least significant bit subgroup.

20. The adder of claim 19, wherein said first plurality of carry-lookahead cells at said first level are arranged in consecutive order from a least significant carry-lookahead cell to a most significant carry-lookahead cell of greater length, and wherein said second plurality of carry-lookahead cells at said first level are arranged in consecutive order from a least significant carry-lookahead cell to a most significant carry-lookahead cell of greater length.

21. The adder of claim 20, wherein the least significant cell of said first plurality of carry-lookahead cells at said first level has inputs for receiving said least significant bit subgroups, and wherein the most significant cell of said second plurality of carry-lookahead cells at said first level has inputs for receiving said most significant bit subgroups.

22. The adder of claim 21, wherein the least significant cell of said first plurality of carry-lookahead cells and the least significant cell of said second plurality of carry-lookahead cells have equal length.

23. The adder of claim 22, wherein said first and said second plurality of carry-lookahead cells at said first level and said first plurality of carry-lookahead cells at said second level comprise Manchester carry-chains having a single carry-generate output signal line and a single carry-propagate output signal line.

24. The adder of claim 23, wherein said first plurality of carry-lookahead cells at said second level are arranged in consecutive order from a least significant carry-lookahead cell to a most significant carry-lookahead cell of greater length.

25. The adder of claim 24, wherein the least significant cell of said first plurality of carry-lookahead cells at said second level is connected to said first plurality of carry-lookahead cells at said first level, and wherein the most significant cell of said first plurality of carry-lookahead cells at said second level is connected to said second plurality of carry-lookahead cells at said first level.

26. The adder of claim 25, wherein said first binary adder and said second binary adder comprise binary ripple adders.

27. The adder of claim 1, 12 or 18, wherein each of said binary adders comprises:

- a plurality of carry-lookahead cells at a first binary adder level, at least two of which are of different length, said plurality of carry-lookahead cells having inputs for receiving a consecutively ordered group of carry-propagate bits and a corresponding consecutively ordered group of carry-generate bits, and wherein said corresponding consecutively ordered groups of said carry-propagate and said carry-generate bits are derived from a respective bit group of said first binary operand and a corresponding bit group of said second binary operand;
- a plurality of pairs of ripple adders at a third binary adder level, wherein one of each of said plurality of said pairs performs binary summation of a respective portion of said bit group of said first binary operand and a corresponding portion of said bit group of said second binary operand, assuming the presence of a binary carry into the least significant bits of said corresponding portions, and wherein the other of each of said plurality of pairs performs binary summation of said corresponding portions assuming the absence of a carry into the least significant bits of said corresponding portions; and
- a carry-lookahead cell at a second binary adder level, connected to said plurality of carry-lookahead cells at said first binary adder level, having a plurality of outputs for selecting respective ones of each of said plurality of pairs of ripple adders, based on an actual binary carry into the respective least significant bits of said corresponding portions, so that said adder for performing binary summation of the first binary operand and the second binary operand is a recursive adder.

28. The adder of claim 27, wherein said first plurality of carry-lookahead cells at said first binary adder level comprise Manchester carry-chains having a single carry-propagate output signal line and a single carry-generate output signal line.

29. The adder of claim 28, wherein said carry-lookahead cell at said second binary adder level comprises a Manchester carry-chain having a plurality of intermediate output signal lines.

* * * * *